United States Patent
Liu et al.

(10) Patent No.: US 10,482,916 B1
(45) Date of Patent: Nov. 19, 2019

(54) AUTOMATIC CD PROCESSING FACILITY

(71) Applicant: Jiangsu Fine Storage Information Technology Co., Ltd., Changshu (CN)

(72) Inventors: Yilin Liu, Wuhan (CN); Hui Luo, Changsha County (CN)

(73) Assignee: Jiangsu Fine Storage Information Technology Co., Ltd., Changshu (CN)

( * ) Notice: Subject to any disclaimer, the term of this patent is extended or adjusted under 35 U.S.C. 154(b) by 0 days.

(21) Appl. No.: 16/196,167

(22) Filed: Nov. 20, 2018

(51) Int. Cl.
*G11B 17/12* (2006.01)
*B25J 15/00* (2006.01)

(52) U.S. Cl.
CPC .......... *G11B 17/12* (2013.01); *B25J 15/0038* (2013.01)

(58) Field of Classification Search
CPC .............................. G11B 17/12; B25J 15/0038
See application file for complete search history.

(56) References Cited

U.S. PATENT DOCUMENTS

| | | | | |
|---|---|---|---|---|
| 5,128,912 A * | 7/1992 | Hug | ...................... | G11B 17/225 360/99.02 |
| 5,293,284 A * | 3/1994 | Sato | .................... | G11B 15/6835 360/92.1 |
| 5,663,938 A * | 9/1997 | Dang | .................... | G11B 17/225 360/92.1 |
| 5,818,723 A * | 10/1998 | Dimitri | ................ | G11B 17/223 700/214 |
| 5,940,356 A * | 8/1999 | Toumbas | .............. | G11B 17/225 360/92.1 |
| 6,022,180 A * | 2/2000 | Motoyama | ......... | G11B 15/6835 414/277 |
| 6,023,643 A * | 2/2000 | Jesionowski | ........ | G06Q 10/087 369/30.31 |
| 6,175,466 B1 * | 1/2001 | Hori | .................... | G11B 15/6835 360/92.1 |
| 6,215,315 B1 * | 4/2001 | Maejima | ............ | G11B 15/6835 324/539 |
| 6,438,623 B1 * | 8/2002 | Ryan | .................. | G11B 15/6835 360/92.1 |
| 6,648,574 B2 * | 11/2003 | Williams | ........... | G11B 15/6835 414/277 |
| 6,868,049 B2 * | 3/2005 | Ostwald | ............... | G11B 17/225 360/99.02 |
| 6,931,304 B1 * | 8/2005 | Miller | ................ | G11B 15/6835 369/30.34 |
| 7,158,326 B2 * | 1/2007 | Hanagata | ........... | G11B 15/6835 360/69 |

(Continued)

*Primary Examiner* — Brian E Miller
(74) *Attorney, Agent, or Firm* — Maier & Maier, PLLC

(57) ABSTRACT

An automatic CD processing facility includes a mechanical gripper used for clamping a CD, storage cabinets located on side faces of the mechanical gripper and used for storing CDs, and a CD driver array cabinet located in front of or/and behind the mechanical gripper and used for processing the CDs. the CDs are placed in the storage cabinets and then are transferred by the mechanical gripper into the CD driver array cabinet to be processed, and after being processed, the CDs are taken out of the CD driver array cabinet to be placed back into the storage cabinets by the mechanical gripper. The automatic CD processing facility is high in automation degree, replaces traditional manual operation to take and place CDs, and improves processing efficiency.

8 Claims, 15 Drawing Sheets

(56) References Cited

U.S. PATENT DOCUMENTS

| | | | | |
|---|---|---|---|---|
| 7,525,756 | B2* | 4/2009 | Nave | G11B 15/689 |
| | | | | 360/92.1 |
| 8,699,178 | B2* | 4/2014 | Kerns | H05K 7/18 |
| | | | | 360/92.1 |
| 2004/0253081 | A1* | 12/2004 | Campbell | G11B 15/6825 |
| | | | | 414/277 |
| 2005/0197736 | A1* | 9/2005 | Hanagata | G11B 15/6835 |
| | | | | 700/214 |
| 2006/0090176 | A1* | 4/2006 | Schmidtke | G11B 15/68 |
| | | | | 720/632 |
| 2007/0268790 | A1* | 11/2007 | Arai | G11B 17/028 |
| | | | | 369/30.55 |
| 2008/0016714 | A1* | 1/2008 | Kaneyama | H01L 21/67051 |
| | | | | 34/317 |
| 2010/0249993 | A1* | 9/2010 | Mitsuyoshi | H01L 21/67742 |
| | | | | 700/228 |

* cited by examiner

US 10,482,916 B1

AUTOMATIC CD PROCESSING FACILITY

FIELD

The invention relates to the field of automatic facilities, in particular to an automatic CD processing facility.

BACKGROUND

With the development of the economy and continuous improvement of technology, various data and information are used every day by people for communications in life or work, it is deemed insufficient to backup or store such a huge mass of data purely through USB flash disks or hard disks, and accordingly, CDs are adopted by people to store data. CDs are carriers used to store data with optical information as storage media and allow data to be read therefrom or written therein based on the laser principle, and various multimedia data such as characters, sounds, graphs and animations can be stored in CDs. However, data are nowadays read from CDs or written into CDs by means of manual operation, which results in heavy workloads and low work efficiency; and in this process, CDs are likely to be stained, damaged or lost.

SUMMARY

To overcome the defects of the prior art, the invention provides an automatic CD processing facility, which is high in automation degree and high in work efficiency.

The following technical solution is adopted by the invention to solve corresponding technical problems: an automatic CD processing facility comprises a mechanical gripper, storage cabinet and a CD driver array cabinet, wherein the mechanical gripper is used for clamping materials, the storage cabinets are located on side faces of the mechanical gripper and are used for storing materials; and the CD driver array cabinet is located in front of or/and behind the mechanical gripper and is used for processing materials.

By adoption of the above solution, to-be-processed materials are placed in the storage cabinets and are then taken out by the mechanical gripper from the storage cabinets to be transferred into the CD driver array cabinet used to process the to-be-processed materials; after being processed in the CD driver array cabinet, the materials are conveyed by the mechanical gripper back to the storage cabinets, and in this way, the to-be-processed materials are sequentially and alternately taken out of the storage cabinets and then placed back into the storage cabinets after being processed. After all the to-be-processed materials in the storage cabinets are processed and placed back into the storage cabinets, the storage cabinets full of the processed materials are carried away and are replaced with storage cabinets full of to-be-processed materials. Thus, operation is convenient, the automation degree is high, the labor intensity of workers is effectively relieved, and management of CDs is facilitated.

Preferably, the mechanical gripper comprises a bottom moving mechanism, a vertical moving mechanism, horizontal moving mechanisms and clamping devices, wherein the vertical moving mechanism is slidably connected to the bottom moving mechanism, the horizontal moving mechanisms are slidably connected to the vertical moving mechanism, the clamping devices are slidably connected to the horizontal moving mechanisms and are used for clamping materials, the horizontal moving mechanisms include a first horizontal moving mechanism and a second horizontal moving mechanism symmetrical with the first horizontal moving mechanism, and a middle transfer device is arranged between the first horizontal moving mechanism and the second horizontal moving mechanism and is located on an upper portion of the vertical moving mechanism.

By adoption of the above solution, the position of the mechanical gripper is adjusted in the following way: the distance from the vertical moving mechanism to one storage cabinet or the CD driver array cabinet is adjusted through the bottom moving mechanism, then the vertical distance from the horizontal moving mechanisms to the storage cabinets or the CD driver array cabinet is adjusted through the vertical moving mechanism, and finally, the distance from the clamping devices connected to the horizontal moving mechanisms to the storage cabinet or the CD drive array cabinet is adjusted through the horizontal moving mechanisms; afterwards, materials in the storage cabinet or the CD driver array cabinet are clamped by clamps on the clamping devices. In this way, the automatic CD processing facility can automatically take and place materials and can move along multiple axes, thereby being higher in flexibility and capable of improving production efficiency.

Preferably, the middle transfer device comprises a first motor and a support plate. The output end of the first motor is connected with a sliding ring connected with the support plate. Troughs are arranged on the support plate and are used for storing materials.

By adoption of the above solution, when the storage cabinet is located on one side of the first horizontal moving mechanism and to-be-processed materials near the first horizontal moving mechanism need to be clamped, the materials are directly clamped by the clamping device on the first horizontal moving mechanism; if the to-be-processed materials are away from the first horizontal moving mechanism, the materials are clamped out of the storage cabinet by the clamping device on the second horizontal moving mechanism, then the support plate rotates by 360° under the effect of the first motors and the sliding rings to reach a position where the materials can be clamped by the first horizontal moving mechanism, and afterwards, the materials in the roughs are clamped by the first horizontal moving mechanism to be conveyed into the CD driver array cabinet so as to be processed. In this way, the material transfer efficiency is improved, and the work efficiency is effectively improved.

Preferably, the vertical moving mechanism comprises a support and a second motor. A first lead screw and a second lead screw are respectively arranged on the lower portion and the upper portion of the support. The first lead screw is connected with the second motor. A first belt wheel and a second belt wheel are respectively arranged at two ends of the first lead screw. A third belt wheel and a fourth belt wheel are arranged at two ends of the second lead screw. A first synchronous belt is connected between the first belt wheel and the third belt wheel. A second synchronous belt is connected between the second belt wheel and the fourth belt wheel. Each horizontal moving mechanism has two ends respectively connected to the first synchronous belt and the second synchronous belt. First guide rails are symmetrically arranged on two side edges of the support. First sliding blocks are slidably connected to the first guide rails and are fixed to the horizontal moving mechanisms.

Preferably, the first horizontal moving mechanism and the second horizontal moving mechanism each comprise a fixing plate and a third motor. A driving belt wheel and a driven belt wheel are respectively arranged at two ends of each fixing plate. A third synchronous belt is connected between each driving belt wheel and the corresponding driven belt wheel and is connected with the corresponding clamping device. The third motors are connected with the driving belt wheels and are fixed to the fixing plates. Second guide rails are symmetrically arranged on each fixing plate. Second sliding blocks are slidably connected to the second guide rails and are connected with the clamping devices.

Preferably, each clamping device comprises a supporting frame and a fourth motor. First connecting plates are connected two side edges of each supporting frame. Hook pieces are fixed to the ends of the first connecting plates. Vertical output shafts of the fourth motors downwards penetrate through the supporting frames to be connected with sliding rings. The lower portions of the sliding rings are connected with second connecting plates. The other end of each second connecting plate is connected with a clamp.

Preferably, the bottom moving mechanism comprises a bottom plate, a mounting plate and a pair of racks symmetrically fixed to the bottom plate. The mounting plate is located above the bottom plate. A third guide rail and a fourth guide rail are symmetrically arranged on the bottom plate. Third sliding blocks are slidably connected to the third guide rail and the fourth guide rail and are connected with the lower surface of the mounting plate. Fifth motors used for driving the connecting plates to slide are arranged on the mounting plate. The output ends of the fifth motors are connected with gears. The gears are engaged with the racks located between the third guide rail and the fourth guide rail. The upper surface of the mounting plate is connected with the vertical moving mechanism. A fifth guide rail is arranged between the two racks and is fixed to the bottom plate. A fourth sliding block is slidably connected to the fifth guide rail and is connected with the lower surface of the mounting plate.

By adoption of the above solution, when the vertical moving mechanism is connected to the mounting plate, the fifth motors start to rotate to drive the gears to rotate, the gears are then engaged with the racks to drive the third sliding blocks connected with the mounting plate to slide on the third guide rail and the fourth guide rail, and then, the vertical moving mechanism connected to the mounting plate is driven to move. By adoption of the gear-rack transmission method, the transmission efficiency is higher, and the stability is better; and through the cooperation of the sliding blocks and the guide rails, the friction force generated in the sliding process can be reduced.

Preferably, the storage cabinet comprises a cabinet body, wherein two or more storage units are arranged in the cabinet body layer-by-layer, each storage unit comprises a carrier provided with at least one tray used for storing materials, sliding rods are connected to the left side and the right side of each carrier, two ends of each sliding rod are fixed to the cabinet body, a hook holder is arranged in front of the trays on each carrier, and the mechanical gripper pulls out the carriers through the hook holders.

By adoption of the above solution, the storage units are arranged in the cabinet body layer-by-layer, and each storage unit is provided with at least one tray used for storing materials, so that more materials can be stored in the cabinet body and can be managed more easily.

Preferably, the bottom of each tray is hollowed out with a supporting edge reserved, and each supporting edge has an inclined supporting face.

Preferably, the CD driver array cabinet comprises a storage bin. Supporting strips are arranged in the storage bin and form a plurality of mounting sites arrayed in rows and columns. Processing units are mounted in the mounting sites. Each processing unit comprises a box and at least one CD driver arranged in the box layer-by-layer. Each box has an open front side and a back side provided with a third connecting plate. A circuit board is mounted on the back side of each third connecting plate.

Compared with the prior art, the invention has the following beneficial effects: a plurality of storage units are arranged in the storage cabinet, and a plurality of trays used for storing materials are arranged in each storage unit, so that more materials can be stored in the storage cabinet and can be managed conveniently; after to-be-processed materials are placed in the storage cabinets, the front-back position of the vertical moving mechanism with respect to the storage cabinet is adjusted through the bottom moving mechanism; after the position of the vertical moving mechanism is adjusted, the vertical moving mechanism drives the horizontal moving mechanisms to move upwards or downwards; after the vertical distance from the horizontal moving mechanisms to the to-be-clamped materials in the storage cabinet, the horizontal moving mechanisms drive the clamping devices to move towards the to-be-clamped materials; after moving to the to-be-clamped materials, the clamping devices start to clamp the materials in the storage cabinet, and then the clamped materials are placed in the CD driver array cabinet to be processed through the cooperation of the horizontal moving mechanisms, the vertical moving mechanism and the bottom moving mechanism; after being processed in the CD driver array cabinet, the materials are taken out of the CD driver array cabinet in the same way to be placed back into the storage cabinet, and thus, a series of operations for processing and storing the materials are completed. The automatic CD processing facility is convenient to operate, high in automation degree, and capable of effectively relieving the labor intensity of workers and improving processing efficiency; and meanwhile, CDs can be managed more conveniently, and the situation that the surfaces of materials are stained or damaged or materials are lost due to manual operation is avoided.

BRIEF DESCRIPTION OF THE FIGURES

The invention is further explained below with reference to accompanying drawings and embodiments.

1—CD driver array cabinet; 11—supporting strip; 12—cooling fan; 13—storage bin; 14—electric box; 15—processing unit; 151—box; 152—CD driver; 153—third connecting plate; 154—circuit board; 2—storage cabinet; 21—cabinet body; 22—storage unit; 221—tray; 2211—supporting edge; 2212—mounting hole; 2213—reinforcing rib; 222—hook holder; 223—carrier; 23—sliding rod; 3—mechanical gripper; 31—first horizontal moving mechanism; 32—vertical moving mechanism; 3201—support; 3202—third belt wheel; 3203—first sliding block; 3204—first belt wheel; 3205—first synchronous belt; 3206—second motor; 3207—first lead screw; 3208—second belt wheel; 3209—second synchronous belt; 3210—fourth belt wheel; 3211—second lead screw; 3212—first guide rail; 3213—tooth groove; 3214—first clamping block; 3215—second clamping block; 33—middle transfer device; 3301—support plate; 3302—trough; 3303—sliding ring; 3304—first motor; 34—second horizontal moving mechanism; 3401—third motor; 3402—drag chain groove; 3403—second sliding block; 3404—second guide rail; 3405—driven belt wheel; 3406—third synchronous belt; 3407—driving belt wheel; 3408—fixing plate; 35—clamping device; 3501—fourth motor; 3502—sliding ring; 3503—second connecting plate; 3504—supporting frame; 3505—first connecting plate; 3506—hook piece; 36—bottom moving mechanism; 3601—rack; 3602—fifth motor; 3603—mounting plate; 3604—third guide rail; 3605—foot pad; 3606—bottom plate; 3607—fifth guide rail; 3608—fourth guide rail; 3609—fourth sliding block; 3610—third sliding block; 3611—gear.

DETAILED DESCRIPTION

The invention is further expounded below with reference to the accompanying drawings. These accompanying drawings are simplified views used to illustratively explain the basic structure of the invention and only show components involved in the invention.

Figure 1:
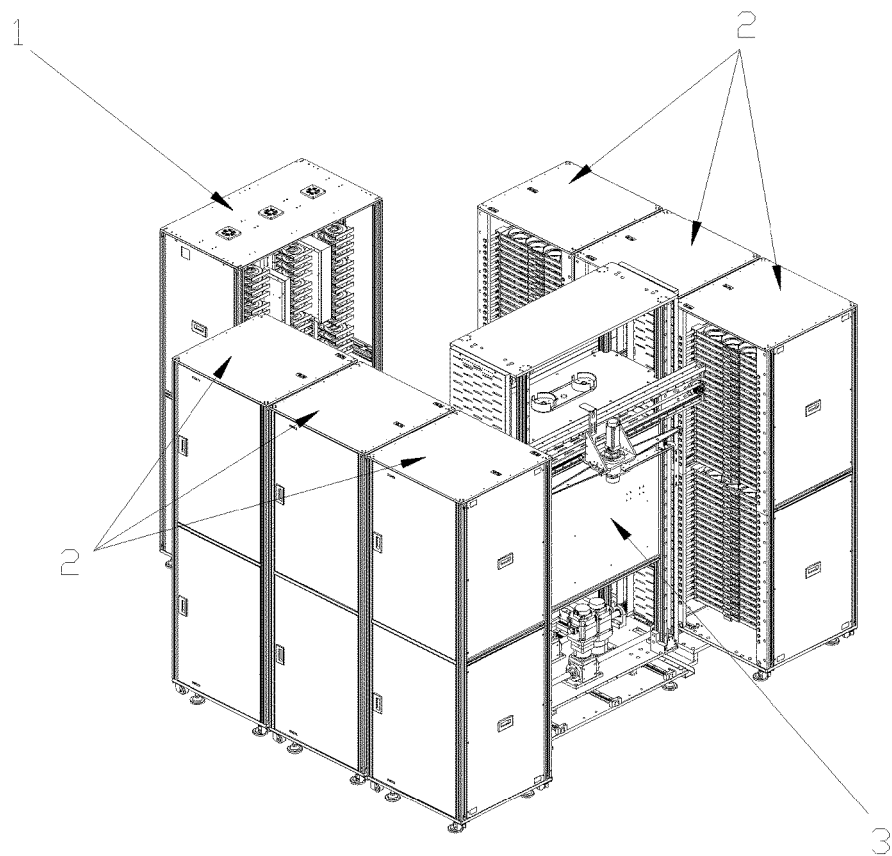
FIG. 1 is a structural view of an automatic CD processing facility of the invention.
Figure 2:
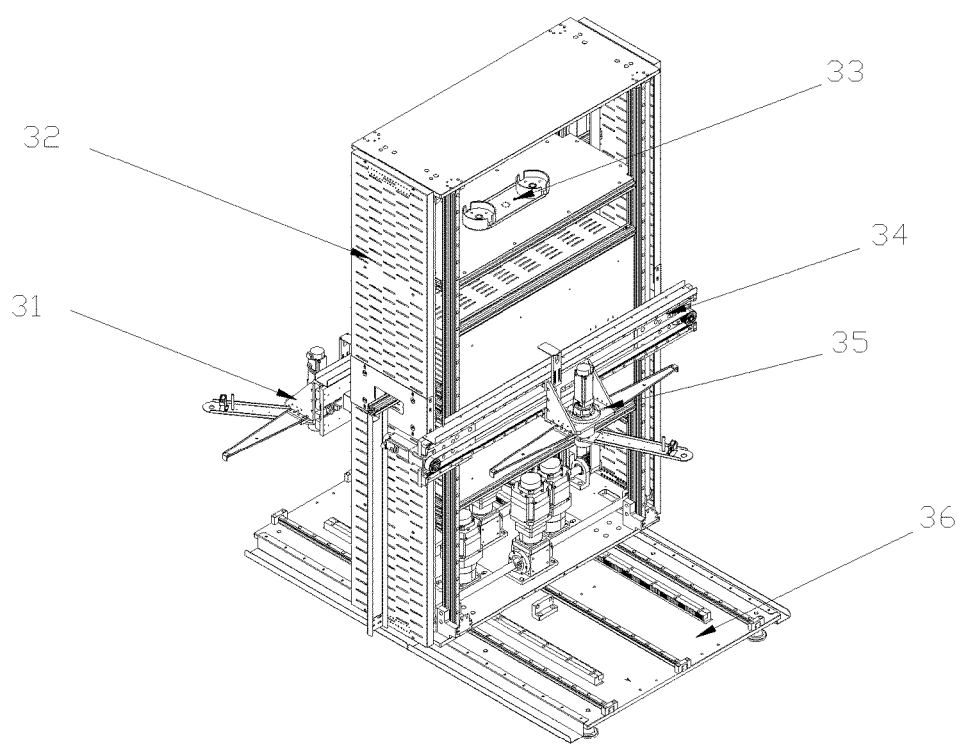
FIG. 2 is a structural view of a mechanical gripper of the invention.
Figure 3:
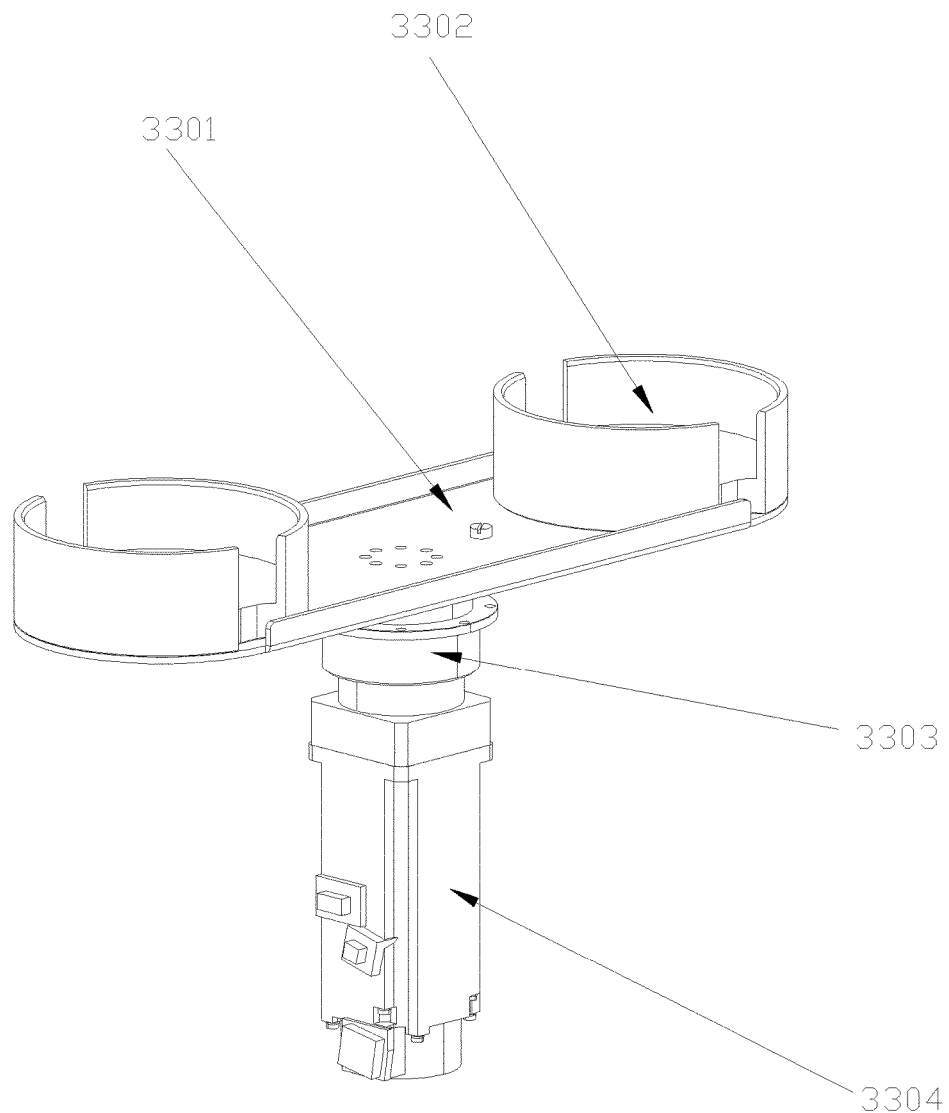
FIG. 3 is a schematic view of a middle transfer device of the invention.
Figure 4:
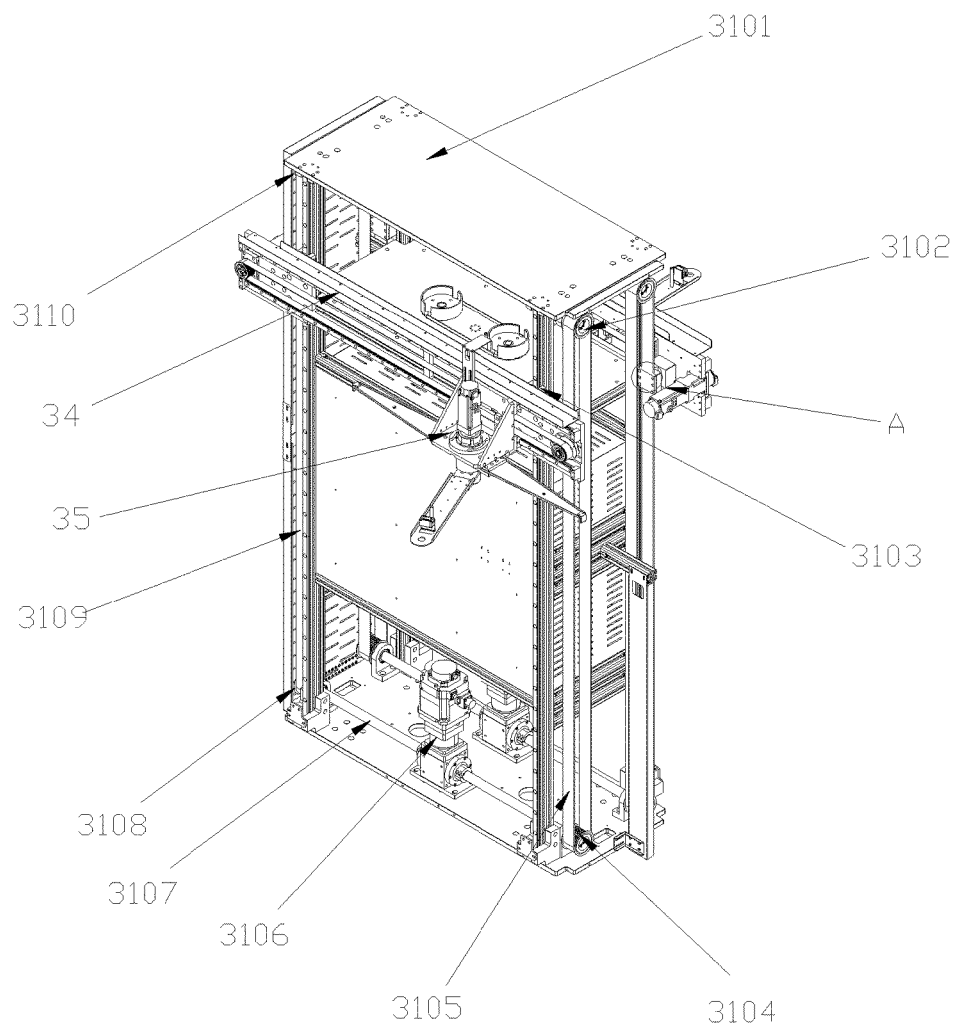
FIG. 4 is a schematic view of a vertical moving mechanism of the invention.
Figure 5:
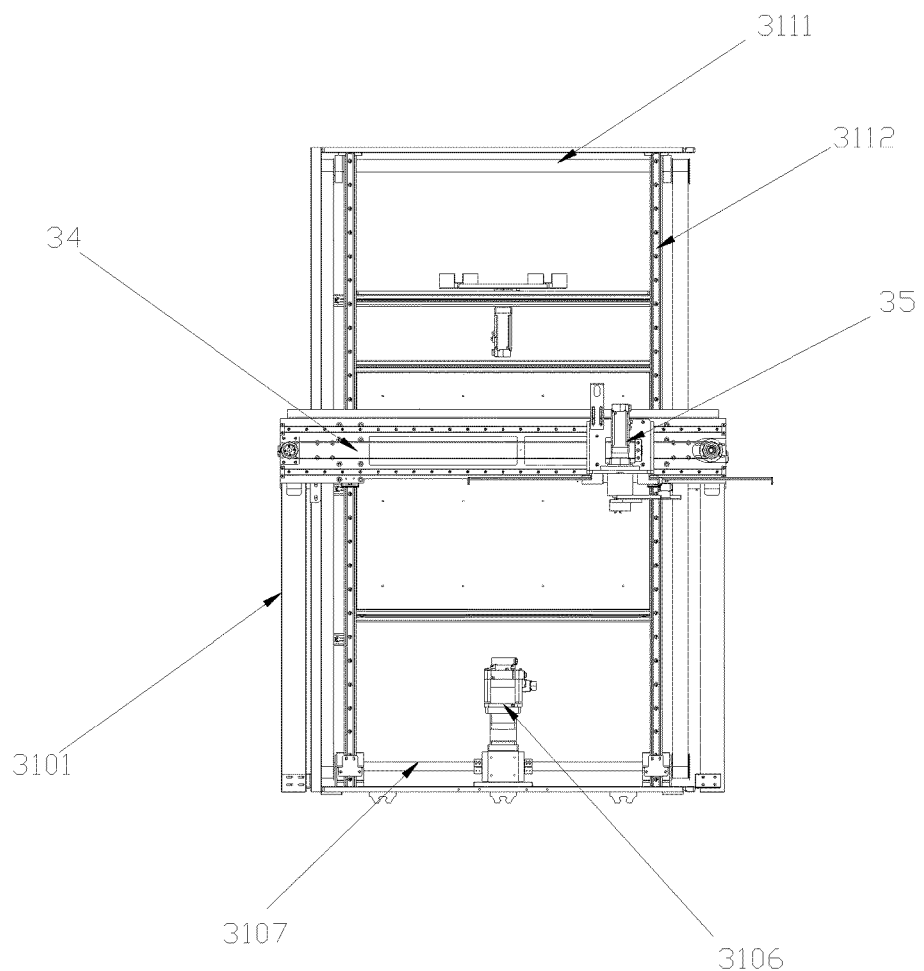
FIG. 5 is a front view of the vertical moving mechanism of the invention.
Figure 6:
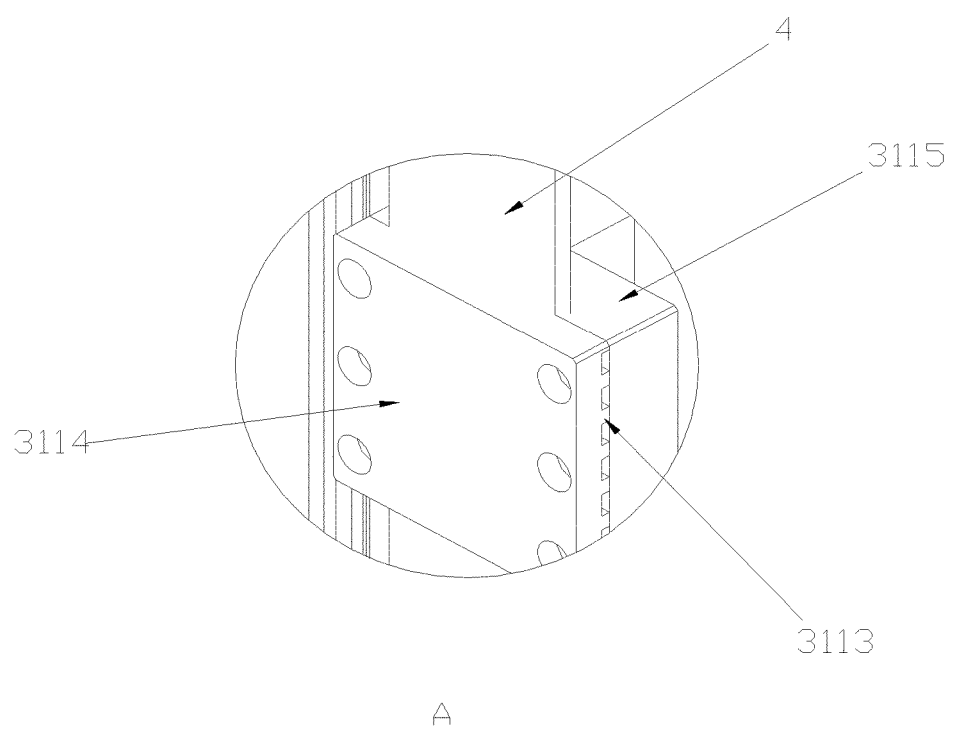
FIG. 6 is an enlarged view of part A in FIG. 4.
Figure 7:
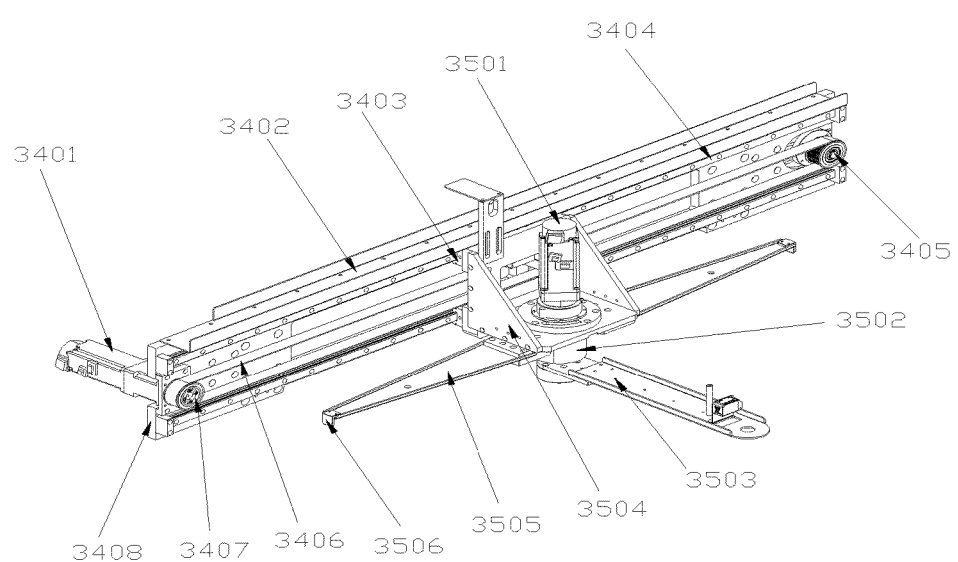
FIG. 7 is a connection diagram of a horizontal moving mechanism and a clamping device of the invention.
Figure 8:
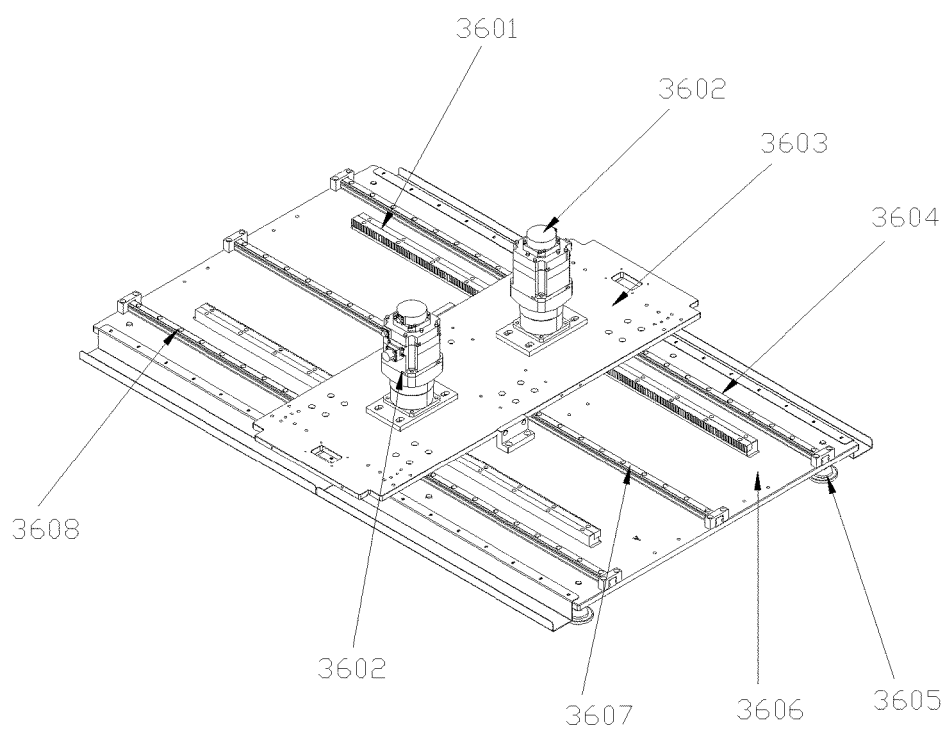
FIG. 8 is a schematic view of a bottom moving mechanism of the invention.
Figure 9:
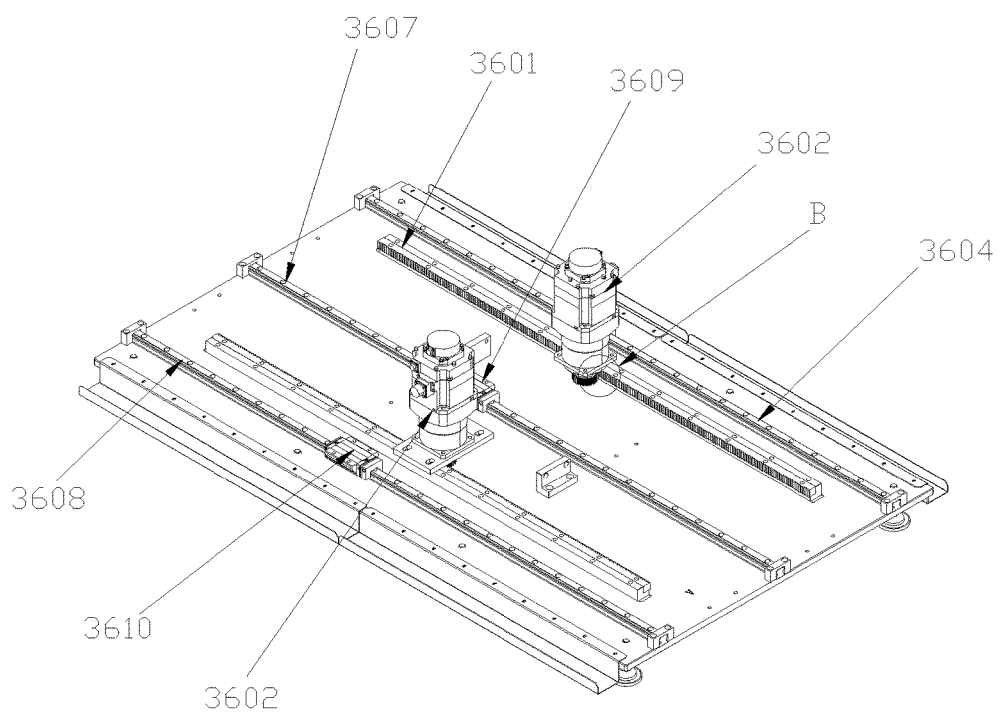
FIG. 9 is a schematic view of the bottom moving mechanism after a mounting plate is removed.
Figure 10:
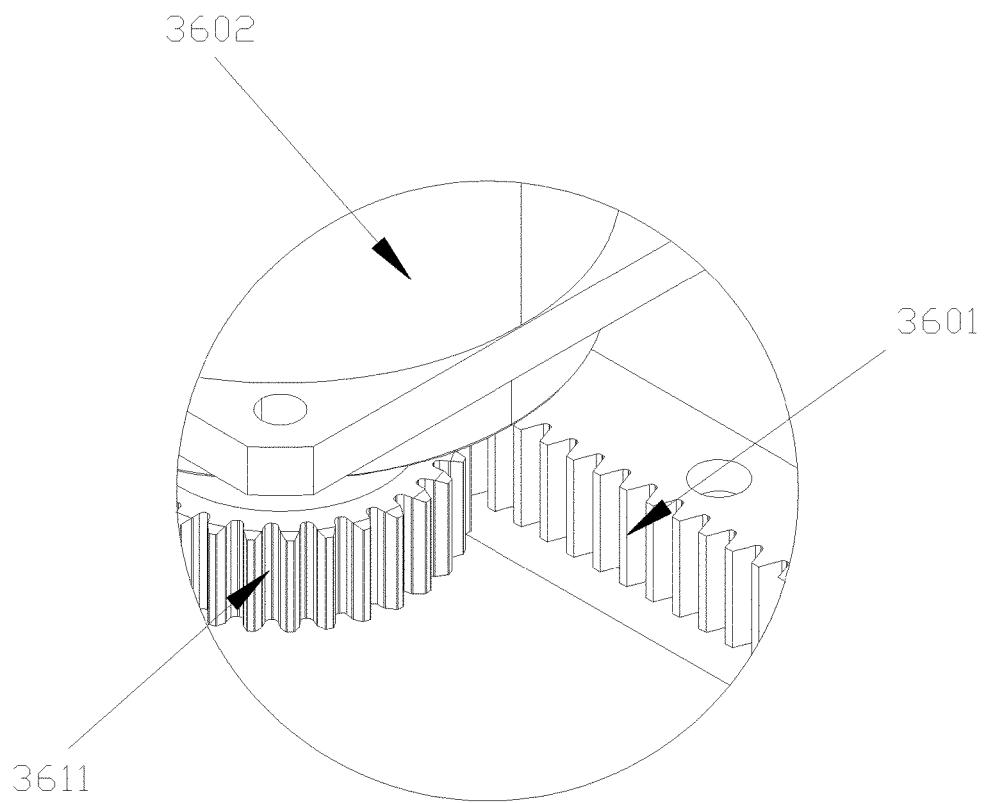
FIG. 10 is an enlarged view of part B in FIG. 9.
Figure 11:
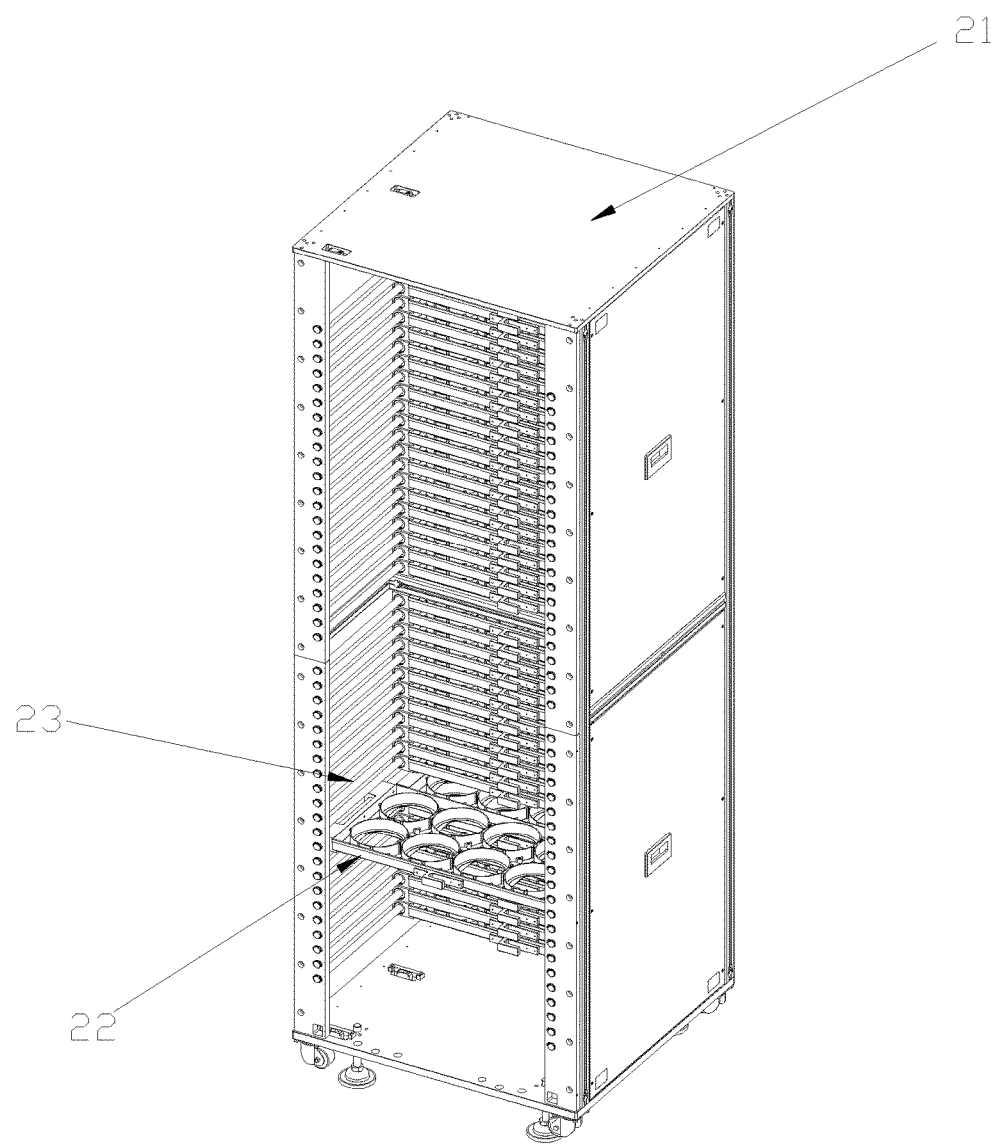
FIG. 11 is a structural view of a storage cabinet of the invention.
Figure 12:
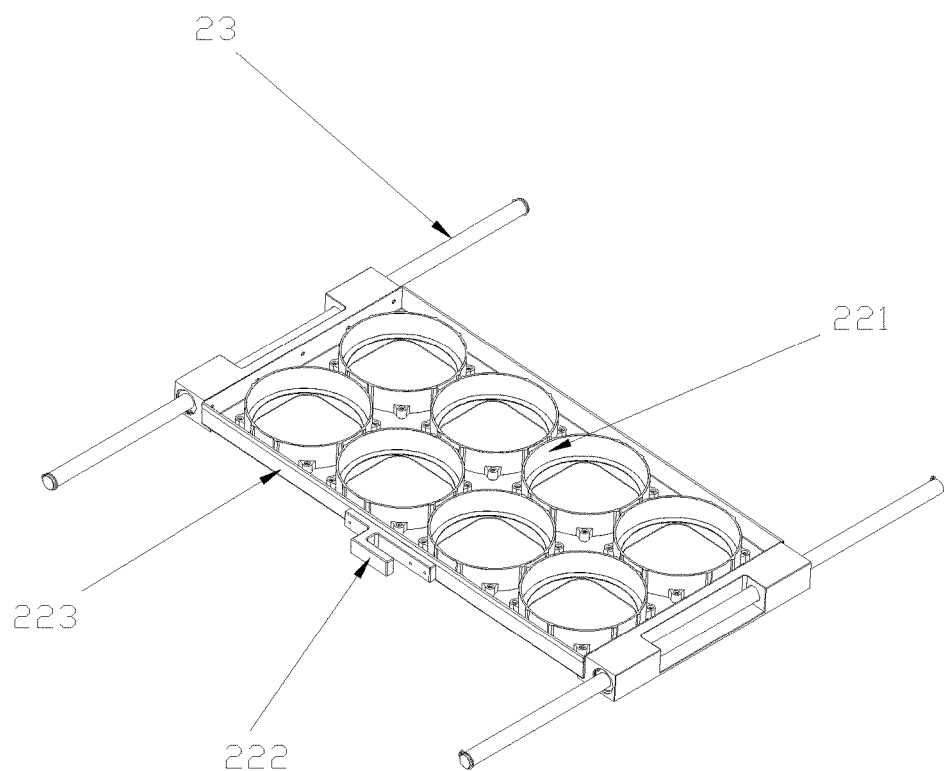
FIG. 12 is a schematic view of a storage unit in the storage cabinet of the invention.
Figure 13:
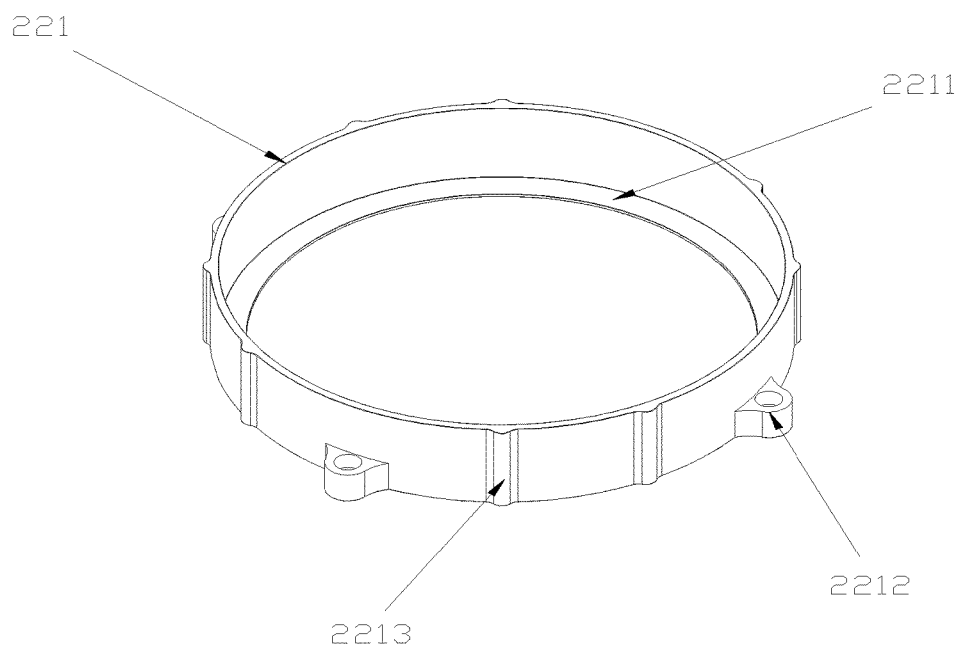
FIG. 13 is a structural view of a tray in the storage unit of the invention.
Figure 14:
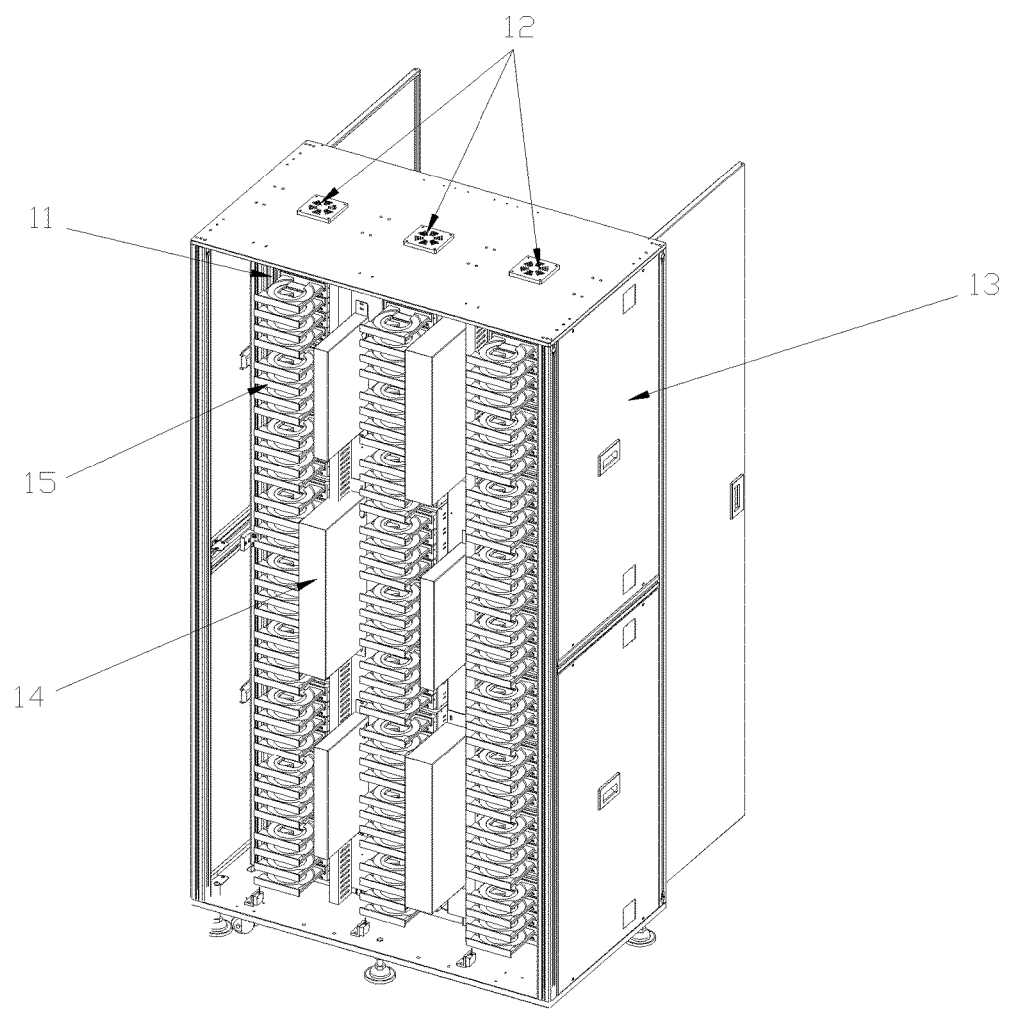
FIG. 14 is a structural view of a CD driver array cabinet of the invention.
Figure 15:
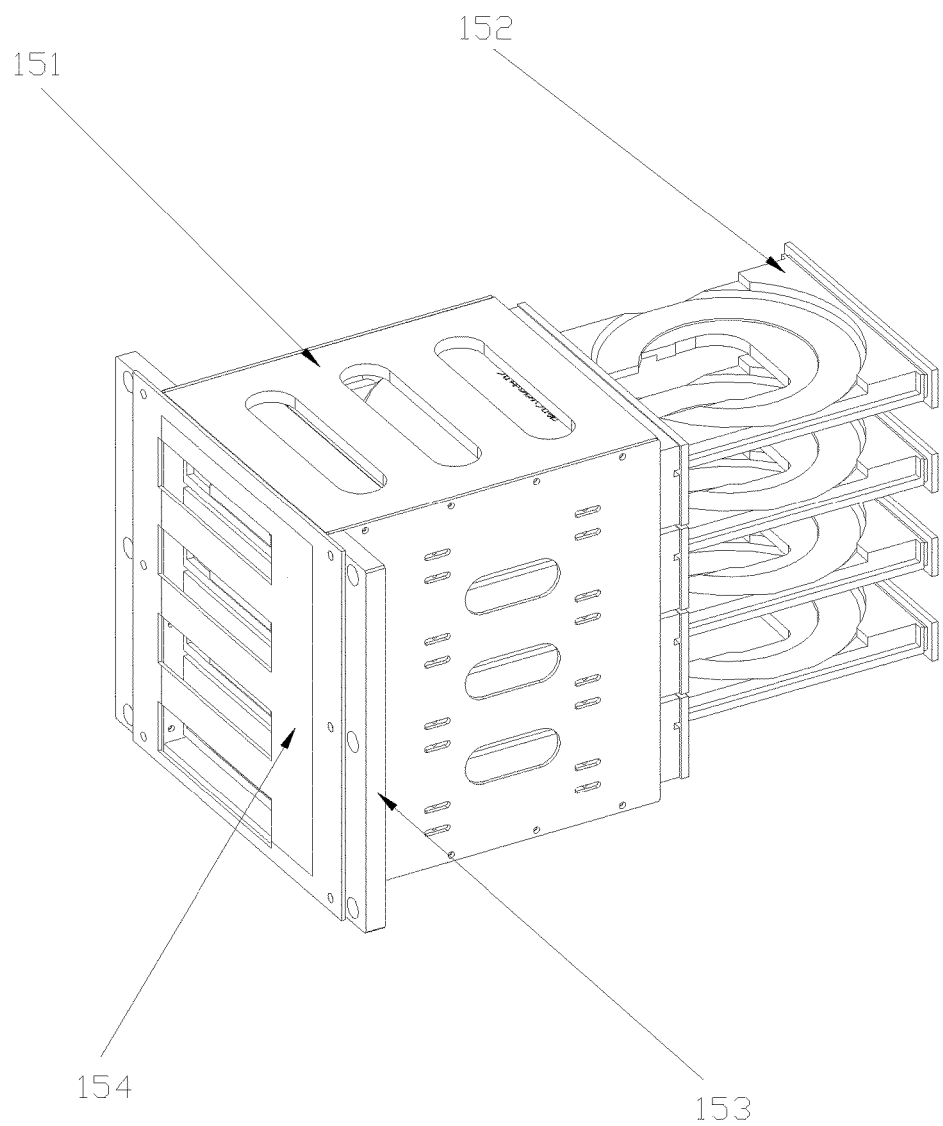
FIG. 15 is a structural view for installing CD drivers of a processing unit of the invention.

Referring to FIGS. 1-15, an automatic CD processing facility comprises a mechanical gripper 3, storage cabinets 2 and a CD driver array cabinet 1. The mechanical gripper 3 is used for clamping materials, such as CDs, into the CD driver array cabinet 1 for processing. The storage cabinets 2 are arranged on two sides of the mechanical gripper 3 and are used for storing materials. The CD driver array cabinet 1 is located behind the mechanical gripper 3 and is used for processing materials. The mechanical gripper 3 takes to-be-processed materials from the storage cabinets and then conveys the to-be-processed materials into the CD driver array cabinet 1, the CD driver array cabinet 1 is used for processing the to-be-processed materials, after being processed in the CD driver array cabinet 1, the materials are conveyed back into the storage cabinets 2 by the mechanical gripper 3, and in this way, the to-be-processed materials are sequentially and alternately taken out of the storage cabinets and then placed back into the storage cabinets after being processed. After all the to-be-processed materials in the storage cabinets 2 are processed and placed back into the storage cabinets 2, the storage cabinets 2 full of the processed materials are carried away and are replaced with storage cabinets 2 full of to-be-processed materials. Thus, operation is convenient, the automation degree is high, the labor intensity of workers is effectively relieved, and management of CDs is facilitated.

Particularly, the mechanical gripper 3 comprises a bottom moving mechanism 36, a vertical moving mechanism 32, horizontal moving mechanisms and clamping devices 35. The vertical moving mechanism 32 is slidably connected to the bottom moving mechanism 36. The horizontal moving mechanisms are slidably connected to the vertical moving mechanism 32. The clamping devices 35 are slidably connected to the horizontal moving mechanisms and are used for clamping materials. The horizontal moving mechanisms include a first horizontal moving mechanism 31 and a second horizontal moving mechanism 34 symmetrical with the first horizontal moving mechanism 31. A middle transfer device 33 is arranged between the first horizontal moving mechanism 31 and the second horizontal moving mechanism 34 and is located on the upper portion of the vertical moving mechanism 32. The middle transfer device 33 comprises a first motor 3304 and a support plate 3301. The output end of the first motor 3304 is connected with a sliding ring 3303 which is connected with the lower end of the support plate 3301. Two troughs 3302 are arranged on the support plate 3301 and are used for temporarily storing materials.

Particularly, the vertical moving mechanism 32 comprises a support 3201 and a second motor 3206. A first lead screw 3207 and a second lead screw 3211 are respectively arranged on the lower portion and the upper portion of the support 3201. The first lead screw 3207 is connected with the second motor 3206. The second motor 3206 is fixed to the lower portion of the support 3201. A first belt wheel 3204 and a second belt wheel 3208 are respectively arranged at two ends of the first lead screw 3207. A third belt wheel 3202 and a fourth belt wheel 3210 are respectively arranged at two ends of the second lead screw 3211. A first synchronous belt 3205 is connected between the first belt wheel 3204 and the third belt wheel 3202. A second synchronous belt 3209 is connected between the second belt wheel 3206 and the fourth belt wheel 3210. Each horizontal moving mechanism has two ends respectively connected to the first synchronous belt 3205 and the second synchronous belt 3209. First guide rails 3212 are symmetrically arranged on two side edges of the support 3201. First sliding blocks 3203 are slidably connected to the first guide rails 3212 and are fixed to the horizontal moving mechanisms.

In this embodiment, the two ends of each horizontal moving mechanism are respectively connected with the first synchronous belt and the second synchronous belt through connecting pieces. Each connecting piece comprises a first clamping block and a second clamping block. Each second clamping block has a right side connected with the corresponding horizontal moving mechanism and a left side matched with the corresponding first clamping block to be fixed to the corresponding synchronous belt. Tooth grooves are formed in surfaces, in contact with the first synchronous belt, of the first clamping blocks, and the synchronous belts are provided with tooth profiles matched with the tooth grooves, so that the horizontal moving mechanisms have the same speed as the synchronous belts when moving on the vertical moving mechanism, thereby being capable of moving upwards or downwards on the support more steadily and rapidly.

Particularly, the first horizontal moving mechanism 31 and the second horizontal moving mechanism 34 each comprise a fixing plate 3408 and a third motor 3401. A driving belt wheel 3407 and a driven belt wheel 3405 are respectively arranged at two ends of each fixing plate 3408. A third synchronous belt 3406 is connected between each driving belt wheel 3407 and the corresponding driven belt wheel 3405. The third synchronous belts 3406 are connected with the clamping devices 35 through connecting pieces of the same structure. The third motors 3401 are connected with the driving belt wheels 3407, are located on the back sides of the fixing plates 3408 and are perpendicularly fixed to the fixing plates 3408. Second guide rails 3404 are symmetrically arranged on each fixing plate 3408. Second sliding blocks 3403 are slidably connected to the second guide rails 3404 and are connected with the clamping devices 35. Drag chain grooves 3402 are formed in the upper ends of the fixing plates 3408 and are used for accommodating drag chains in which cables are wrapped, so that the cables are prevented from being damaged in the moving process.

Particularly, each clamping device comprises a supporting frame 3504 and a fourth motor 3501. First connecting plates 3505 are connected to two side edges of each supporting frame 3504. Hook pieces 3506 are fixed to the ends of the first connecting plates 3505 and are used for hooking out storage units in the storage cabinets. An output shaft of each fourth motor 3501 perpendicularly penetrates through the corresponding supporting frame 3504 downwards to be connected with a sliding ring 3502. The lower portion of each sliding ring 3502 is connected with a second connecting plate 3503. The other end of each second connecting plate 3503 is connected with a clamp.

In this embodiment, the first connecting plates gradually become narrower from the ends connected with the supporting frames to the other ends, so that the weight of the supporting frames is reduced, and the first connecting plates can stretch into the storage cabinets to hook out the storage units. The hook pieces are shaped like Arabic numeral "7" and have one ends fixed to the ends of the corresponding first connecting pieces through bolts, thereby being simple in structure and capable of hooking the storage units more conveniently. The output shafts of the fourth motors are connected with the sliding rings connected with the second connecting plates, so that the second connecting plates can rotate by 360° under the effect of the motors and the sliding rings, and thus, materials can be clamped more conveniently, and the flexibility is higher.

Particularly, the bottom moving mechanism 36 comprises a bottom plate 3606, a mounting plate 3603 and a pair of racks 3601 symmetrically fixed to the bottom plate 3606. The mounting plate 3603 is located above the bottom plate 3606. A third guide rail 3604 and a fourth guide rail 3608 are symmetrically arranged on the bottom plate 3606. Third sliding blocks 3610 are slidably connected to the third guide rail 3604 and the fourth guide rail 3608 and are connected with the lower surface of the mounting plate 3603. Fifth motors 3602 used for driving the connecting plates to slide are arranged on the mounting plate 3603. Output shafts of the fifth motors 3602 are connected with gears 3611 engaged with the racks 3601. The two racks 3601 are located between the third guide rail 3604 and the fourth guide rail 3608. The upper surface of the mounting plate 3603 is connected with the support of the vertical moving mechanism. A fifth guide rail 3607 is arranged between the two racks 3601 and is fixed to the bottom plate 3606. A fourth sliding block 3609 is slidably connected to the fifth guide rail 3607 and is connected with the lower surface of the mounting plate 3603, so that the mechanical gripper connected to the mounting plate 3603 is prevented from being too heavy, which may otherwise cause instability and damage to the mounting plate 303 when the mounting plate 303 moves. Four foot pads 3605 are connected to the lower surface of the bottom plate 3606 and are respectively located at four corners of the lower surface of the bottom plate 3606, so that the bottom plate 3606 is prevented from sliding when placed on the ground, which may otherwise affect the precision of the mechanical gripper.

Particularly, the storage cabinet 2 comprises a cabinet body 21, wherein two or more storage units 22 are arranged in the cabinet body 21 layer-by-layer. Each storage unit 22 comprises a carrier 223 provided with at least one tray 221 used for storing materials. Sliding rods 23 are connected to the left side and the right side of each carrier 223. Each sliding rod 23 has two ends fixed to the cabinet body 21. A hook holder 222 is arranged in front of the trays 221 on each carrier 223 and is used to be matched with the corresponding hook piece 3506 on the mechanical gripper to drag the carrier 223 out of the cabinet body 21. In this embodiment, the number of trays 221 on each carrier is eight, and the eight trays are evenly arranged in two rows side by side. Each tray 221 is in a circular groove shape, which is beneficial to material storage. Reinforcing ribs 2213 are arranged on the outer side of each tray 221 to improve the strength of the tray 221. The trays are connected to the carriers 223 through bolts penetrating through mounting holes 2212 in the trays, thereby being convenient to assemble, disassemble and replace.

Particularly, the bottom of each tray 221 is hollowed out with a supporting edge 2211 reserved. Each supporting edge 2211 has an inclined supporting face with an inclination angle of 3°-8°, so that only the outer edge of the inclined supporting face makes contact with materials, thus, avoiding scratches to the materials caused by face contact.

Particularly, the CD driver array cabinet 1 comprises a storage bin 13. Supporting strips 11 are arranged in the storage bin 13. A plurality of mounting sites arrayed in rows and columns are formed by the supporting strips 11. Processing units 15 are mounted in the mounting sites and each comprise a box 151 and at least one CD driver 152 mounted in the box 151 layer-by-layer. Each box 151 has an open front side and a back side provided with a third connecting plate 153. A circuit board 154 is mounted on the back side of each third connecting plate 153.

In this embodiment, four CD drivers 152 are mounted in each box 151 layer-by-layer and are spaced from one another by the same distance, so that the processing units 15 are prevented from being too heavy and are convenient to assemble and disassemble. The number of the mounting sites is twenty-seven, and the twenty-seven mounting sites are arrayed in nine rows and three columns. An electric box 14 and a wiring trough are disposed on the portions, between every two columns of mounting sites, of the supporting strips 11. The electric boxes 14 are located on the front side of the CD driver array cabinet 1, the wiring troughs are located on the back side of the CD driver array cabinet 1, and cables in the electric boxes 14 penetrate through the wiring troughs to be connected with the circuit boards 154, and thus, the layout is reasonable, and wiring is convenient. Three cooling fans 12 are arranged at the top of the storage bin 13 and are able to rapidly dissipate heat in the storage bin 13, thus, improving the cooling effect.

Operating principle: to-be-processed materials are placed in the storage cabinets, and then the fifth motors are started to drive the gear to be engaged with the racks to drive the vertical moving mechanism connected to the mounting plate to move leftwards or rightwards; when the vertical moving mechanism moves to one side of to-be-clamped materials, the fifth motors stop rotating, the second motor is started to drive the first lead screw and the second lead screw to rotate to enable the first synchronous belt and the second synchronous belt to operate, and at this moment, the horizontal moving mechanisms connected with the first synchronous belt and the second synchronous belt start to move upwards or downwards; when the horizontal moving mechanisms move to an altitude corresponding to the to-be-clamped materials, the second motor stops rotating, and the third motors start to rotate to drive the driving belt wheels to rotate, and the third synchronous belts start to operate to drive the clamping devices connected to the third synchronous belts to move towards the to-be-clamped materials; when the clamping devices move to a position where the corresponding hook holder can be hooked, the third motors start to reversely rotate to pull out the corresponding carrier in the storage cabinet; after the carrier is pulled out, the third motors stop rotating, the fourth motors start to rotate to drive the second connecting plates to rotate by 360°; when the second connecting plates rotate to a position above the carrier, the fourth motors stop rotating, the clamps connected to the second connecting plates start to clamp the materials in the trays; after the materials are clamped by the clamps, the fifth motors start to rotate to move the materials clamped by the clamps towards the CD driver array cabinet; when the vertical moving mechanism moves in front of the CD driver array cabinet, the fifth motors stop rotating, the second motor rotates to drive the horizontal moving mechanisms to move upwards or downwards; when the horizontal moving mechanisms move to an altitude corresponding to the position, where the materials are to be placed, in the CD driver array cabinet, the second motor stops rotating, and at this moment, the third motors start to rotate to drive the clamping devices connected to the third synchronous belts to move towards the processing units in the CD driver array cabinet; when the clamping devices move to a position above the processing units, the third motors stop rotating, the fourth motors start to rotate to drive the second connecting plates to rotate by 360°; when the second connecting plates rotate to overlap with the processing units, the materials are released by the clamps and are then placed in the processing units in the CD driver array cabinet so as to be processed; and after the materials are processed by the processing units, the above operation for clamping materials is repeated to place the processed materials back into the storage cabinets. In this way, the automatic CD processing facility is high in automation degree, avoids damage to the surfaces of materials caused by manual operation, relieves the labor intensity of workers, and is high in work efficiency.

Under the enlightenment of the above ideal embodiments of the invention, various alterations and modifications can be made by those skilled in this field without deviating from the technological thought of the invention. The technical scope of the invention is by no means limited to the contents in the specification and should be defined in terms of the claims when necessary.

What is claimed is:

1. An automatic CD processing facility, comprising:
    a mechanical gripper, wherein the mechanical gripper is used for clamping a CD, wherein the mechanical gripper comprises a bottom moving mechanism, a vertical moving mechanism, horizontal moving mechanisms and clamping devices,
        wherein the vertical moving mechanism is slidably connected to the bottom moving mechanism, the horizontal moving mechanisms are slidably connected to the vertical moving mechanism, the clamping devices are slidably connected to the horizontal moving mechanisms and are used for clamping the CDs,
    the horizontal moving mechanisms include a first horizontal moving mechanism and a second horizontal moving mechanism symmetrical with the first horizontal moving mechanism, and a middle transfer device is arranged between the first horizontal moving mechanism and the second horizontal moving mechanism and is located on an upper portion of the vertical moving mechanism, wherein the middle transfer device comprises a first motor and a support plate, an output end of the first motor is connected with a sliding ring, the sliding ring is connected with the support plate, and troughs are arranged on the support plate and are used for storing the CDs;
    storage cabinets, wherein the storage cabinets are located on side faces of the mechanical gripper and are used for storing the CDs; and
    a CD driver array cabinet, wherein the CD driver array cabinet is located in front of or behind the mechanical gripper and is used for processing the CD.

2. The automatic CD processing facility according to claim 1, wherein the vertical moving mechanism comprises a support and a second motor, a first lead screw and a second lead screw are respectively arranged on a lower portion and an upper portion of the support, the first lead screw is connected with the second motor, a first belt wheel and a second belt wheel are respectively arranged at two ends of the first lead screw, a third belt wheel and a fourth belt wheel are arranged at two ends of the second lead screw, a first synchronous belt is connected between the first belt wheel and the third belt wheel, a second synchronous belt is connected between the second belt wheel and the fourth belt wheel, each said horizontal moving mechanism has two ends respectively connected to the first synchronous belt and the second synchronous belt, first guide rails are symmetrically arranged on two side edges of the support, and first sliding blocks are slidably connected to the first guide rails and are fixed to the horizontal moving mechanisms.

3. The automatic CD processing facility according to claim 1, wherein the first horizontal moving mechanism and the second horizontal moving mechanism each comprise a fixing plate and a third motor, a driving belt wheel and a driven belt wheel are respectively arranged at two ends of each said fixing plate, a third synchronous belt is connected between each said driving belt wheel and the corresponding driven belt wheel and is connected with the corresponding clamping device, the third motors are connected with the driving belt wheels and are fixed to the fixing plates, second guide rails are symmetrically arranged on each said fixing plate, and second sliding blocks are slidably connected to the second guide rails and are connected with the clamping devices.

4. The automatic CD processing facility according to claim 1, wherein each said clamping device comprises a supporting frame and a fourth motor, first connecting plates are connected to two side edges of each said supporting frame, hook pieces are fixed to ends of the first connecting plates, vertical output shafts of the fourth motors downwards penetrate through the supporting frames to be connected with sliding rings having lower portions connected with second connecting plates, and each said second connecting plate has an end connected with a clamp.

5. The automatic CD processing facility according to claim 1, wherein the bottom moving mechanism comprises a bottom plate, a mounting plate and a pair of racks symmetrically fixed to the bottom plate, wherein the mounting plate is located above the bottom plate, a third guide rail and a fourth guide rail are symmetrically arranged on the bottom plate, third sliding blocks are slidably connected to the third guide rail and the fourth guide rail and are connected with a lower surface of the mounting plate, fifth motors used for driving connecting plates to slide are arranged on the mounting plate, output ends of the fifth motors are connected with gears, the gears are engaged with the racks located between the third guide rail and the fourth guide rail, an upper surface of the mounting plate is connected with the vertical moving mechanism, a fifth guide rail is arranged between the two racks and is fixed to the bottom plate, and a fourth sliding block is slidably connected to the fifth guide rail and is connected with the lower surface of the mounting plate.

6. The automatic CD processing facility according to claim 1, wherein each said storage cabinet comprises a cabinet body, two or more storage units are arranged in each said cabinet body vertically layer-by-layer, each said storage unit comprises a carrier provided with at least one tray used for storing the CDs, sliding rods are connected to a left side and a right side of each said carrier, each said sliding rod has two ends fixed to the cabinet corresponding body, a hook holder is arranged in front of the trays on each said carrier, and the mechanical gripper pulls out the carriers through the hook holders.

7. The automatic CD processing facility according to claim 6, wherein a bottom of each said tray is hollowed out with a supporting edge reserved, and each said supporting edge has an inclined supporting face.

8. The automatic CD processing facility according to claim 1, wherein the CD driver array cabinet comprises a storage bin, supporting strips are arranged in the storage bin and form a plurality of mounting sites arrayed in rows and columns, processing units are mounted in the mounting sites and each comprise a box and at least one CD driver arranged in the box vertically layer-by-layer, each said box has an open front side and a back side provided with a connecting plate, and a circuit board is mounted on a back side of each said connecting plate.

* * * * *